United States Patent [19]
Dubin

[11] 3,762,955
[45] Oct. 2, 1973

[54] SEALED PRIMARY SODIUM-HALOGEN BATTERY

[75] Inventor: Robert R. Dubin, Schenectady, N.Y.

[73] Assignee: General Electric Company, Schenectady, N.Y.

[22] Filed: Feb. 22, 1972

[21] Appl. No.: 228,082

[52] U.S. Cl. .............................. 136/83 R, 136/86 A
[51] Int. Cl. ...................... H01m 1/08, H01m 27/16
[58] Field of Search ........................ 136/83, 20, 6 F, 136/6 FS

[56] References Cited
UNITED STATES PATENTS

| | | | |
|---|---|---|---|
| 3,373,058 | 3/1968 | Bloch | 136/83 R |
| 3,404,036 | 10/1968 | Kummer et al. | 136/86 A |
| 3,455,744 | 7/1969 | Werth et al. | 136/86 A |
| 3,607,417 | 9/1971 | McRae | 136/86 A |
| 3,607,405 | 9/1971 | Christopher | 136/20 |

Primary Examiner—A. B. Curtis
Assistant Examiner—H. A. Feeley
Attorney—John F. Ahern et al.

[57] ABSTRACT

A sealed primary sodium-halogen battery is disclosed which has a high temperature sodium and halogen resistant closed glass envelope surrounding a casing of sodium ion-conductive material with one open end and sealed to the casing adjacent its open end. An anode is positioned preferably in the casing while a cathode of a halogen in conductive material is positioned preferably within the glass envelope between the exterior surface of the casing and the glass envelope and in contact with the casing.

9 Claims, 2 Drawing Figures

PATENTED OCT 2 1973  3,762,955
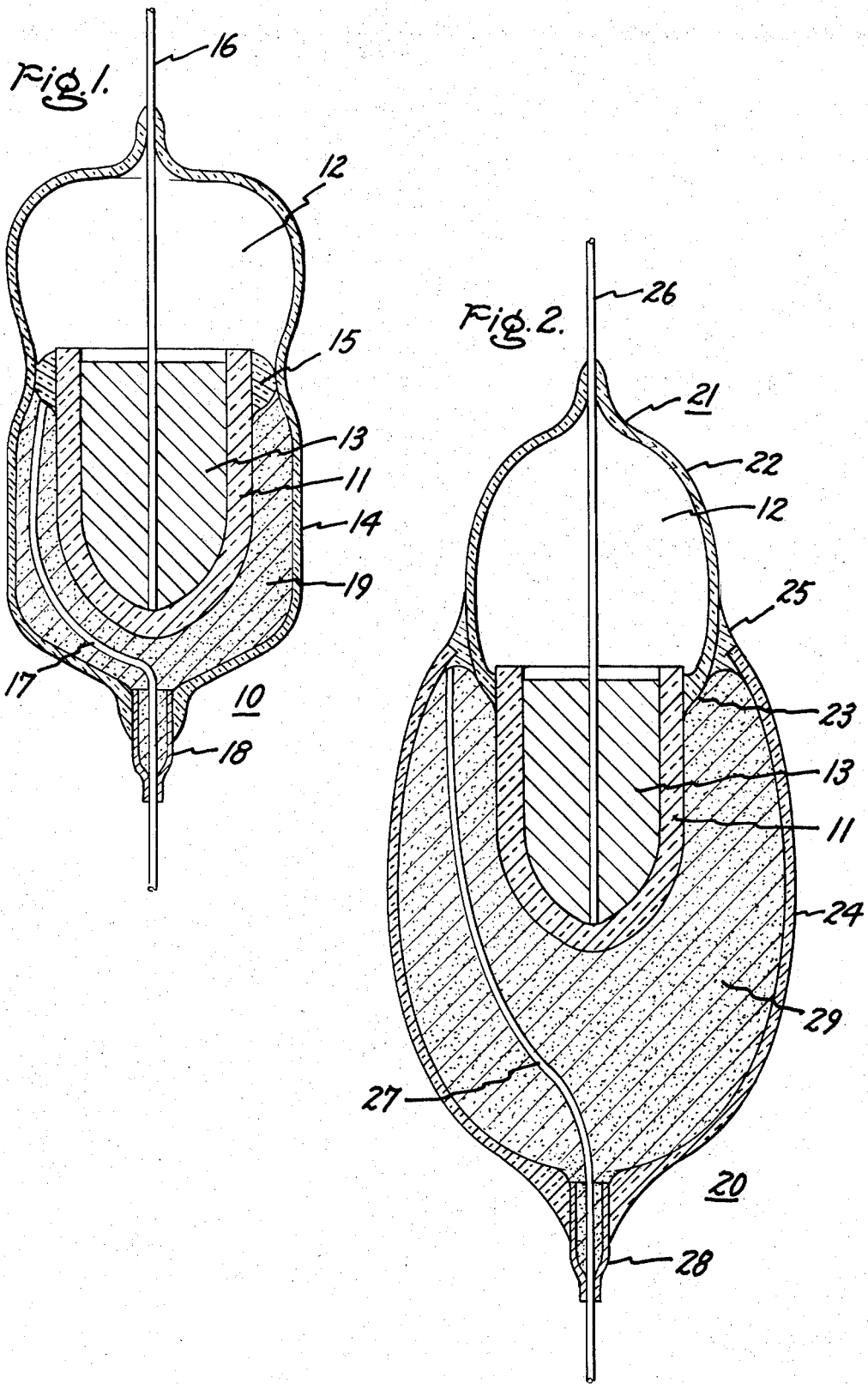

SEALED PRIMARY SODIUM-HALOGEN BATTERY

This invention relates to sealed primary batteries and, more particularly, to such batteries employing an anode of sodium, sodium as an amalgam or sodium in a nonaqueous organic electrolyte and a halogen cathode.

Sodium-sulfur cells, which operate at elevated temperatures, are known in the prior art as, for example, described in Kummer et al U.S. Pat. No. 3,404,036 issued Oct. 1, 1968 under the title "Energy Conversion Device Comprising a Solid Crystalline Electrolyte and a Solid Reaction Zone Separator." The solid crystalline ion-conductive electrolyte in the above-mentioned sodium sulfur battery can be sodium beta-alumina.

Sodium amalgam-oxygen fuel cells are known in the prior art as, for example, described in Eidensohn U.S. Pat. No. 3,057,946 issued Oct. 9, 1962 under the title "Fuel Cell System." A sodium amalgam is flowed over the face of a metallic plate within an aqueous solution of sodium hydroxide to provide the anode.

In copending patent application Ser. No. 153,364, filed June 15, 1971 in the names of Stephan P. Mitoff and Fritz G. Will and entitled "Sealed Primary Sodium Bromine Battery," there is described and claimed such a battery which has a casing, anode positioned in the casing, the anode selected from the class consisting of sodium, sodium as an amalgam, and sodium in a non-aqueous organic electrolyte, a solid sodium ion-conductive electrolyte adjacent the anode, and a bromine ion-conductive material cathode positioned adjacent the opposite side of the electrolyte.

In copending patent application (RD-4752) Ser. No. 216,427, filed Jan. 10, 1972, in the name of Heinrich J. Hess and entitled "Sealed Primary Sodium-Halogen Battery with Bromine-Iodine Mixture," there is described and claimed a sealed primary sodium-halogen battery employing a sodium type anode and a cathode of a mixture of bromine and iodine in conductive material. Both of the above copending patent applications are assigned to the same assignee as the present application.

My present invention is directed to providing a primary sodium-halogen battery operable at temperatures of −48° C to 100° C which battery operates independent of orientation and allows larger currents to be drawn than from a battery of equivalent size employing a solid electrolyte disk.

The primary object of my invention is to provide a low temperature primary battery which has a zero self-discharge rate, high cell voltage and high energy density.

In accordance with one aspect of my invention a sealed primary sodium-halogen battery has a high temperature, sodium and halogen resistant closed glass envelope surrounding a casing of ionic conducting material with one open end and sealed to the casing adjacent its open end. An anode is positioned in the casing while a halogen in conductive material cathode is positioned within the glass envelope between the exterior surface of the casing and the glass envelope and in contact with the casing.

These and various other objects, features and advantages of the invention will be better understood from the following description taken in connection with the accompanying drawing in which:

FIG. 1 is a sectional view of a battery made in accordance with my invention; and FIG. 2 is a sectional view of a modified battery made in accordance with my invention.

In FIG. 1 of the drawing, there is shown generally at 10 a sealed primary sodium-halogen battery comprising a casing 11 of an ionic conducting material with one open end 12, an anode 13 positioned in casing 11, anode 13 selected from the class consisting of sodium, sodium as an amalgam or sodium in a non-aqueous organic electrolyte, a high temperature, sodium and halogen resistant closed glass envelope 14 surrounding casing 11 and sealed at 15 to casing 11 adjacent its open end 12. A first electronic conductor 16 is in contact with the interior surface of casing 11 and extending outwardly through the open end 12 of casing 11 and through glass envelope 14. A second electronic conductor 17 is positioned within glass envelope 14 between the exterior surface of casing 11 and glass envelope 14 and extending outwardly through a metal tube 18 in glass envelope 14. A halogen in conductive material cathode 19 is positioned within glass envelope 14 between the exterior surface of casing 11 and glass envelope 14 and in contact with casing 11.

In FIG. 2 of the drawing, there is shown at 20 a modified sealed primary sodium-halogen battery comprising a casing 11 of an ionic conducting material with one open end 12, an anode 13 positioned in casing 11, anode 13 selected from the class consisting of sodium, sodium as an amalgam or sodium in a non-aqueous organic electrolyte, a high temperature, sodium and halogen resistant closed glass envelope 21 surrounding casing 11 and sealed to casing 11 adjacent its open end 12. Envelope 21 comprises a first envelope portion 22 sealed at 23 to casing 11 adjacent its open end 12, and a second envelope portion 24 sealed at 25 to first envelope portion 22. A first electronic conductor 26 is in contact with the interior surface of casing 11 and extends outwardly through open end 12 of casing 11 and first glass envelope portion 22. A second electronic conductor 27 is positioned within second glass envelope portion 24 between the exterior surface of casing 11 and second glass envelope portion 24 and extends outwardly through a metal tube 28 in second glass envelope portion 24. A halogen in conductive material cathode 29 is positioned within second glass envelope portion 24 between the exterior surface of casing 11 and second glass envelope portion 24 and in contact with casing 11.

Reference is made to U.S. letters Patent 3,607,405 issued Sept. 21, 1971 for a "Sealed Container for Elemental Sodium" which describes and claims such a sealed container which has a casing of an ion-conductive material with one open end, the casing having an exterior surface and an interior surface, an electronic conductor in contact with the interior surface of the ionic conducting material and extending outwardly from the open end of the casing, and a high temperature sodium resistant glass seal sealed to the open end of the casing and to the container. This patent is assigned to the same assignee as the present application. This patent is hereby incorporated by reference into the present application.

I found that I could form a sealed primary sodium halogen battery by providing a casing of an ionic conducting material with one open end, surrounding the casing with a high temperature, sodium and halogen resistant glass envelope and sealing the envelope to the casing adjacent its open end. A first electronic conductor is positioned in contact with the interior surface of the casing and extends outwardly through the open end of the casing and the glass envelope. A second electronic conductor is positioned within the glass envelope between the exterior surface of the casing and the glass envelope and extending outwardly through the glass envelope. The casing is filled through an opening in the envelope with sodium, sodium as an amalgam, or sodium in a non-aqueous organic electrolyte. The opening can be sealed by melting or pinching the edge of the opening against the first conductor. A halogen in conductive material cathode is positioned through an opening in the envelope within the glass envelope between the exterior surface of the casing and the glass envelope and in contact with the casing. The opening can be sealed by melting the edge of the opening against the second conductor. Such batteries have an open circuit voltage of 3.6 volts.

The anode may consist of sodium, a sodium amalgam in the range of compositions from about 95 percent sodium and 5 percent mercury by weight to about 35 percent sodium and 65 percent mercury, or sodium in a non-aqueous organic electrolyte. For the fully charged state of the cell, the amalgam composition is preferably high in sodium. Cells using sodium amalgams cannot be used efficiently at temperatures below 21.5° C due to complete freezing of the amalgam.

The use of organic electrolytes permits cell operation to much lower temperatures as determined by the freezing point of the organic electrolyte. A preferred organic electrolyte is propylene carbonate in which a sodium halide salt is dissolved. This electrolyte permits cell operation down to −48° C.

The cathode comprises a halogen of bromine or a mixture of 5 to 60 weight percent iodine and bromine in an electronically conductive porous matrix of carbon felt or foam metal. Additional conductive materials for the bromine-iodine mixture include small amounts of additives, such as NaCl, NaBr, KCl, $AlCl_3$, $AlBr_3$, POCl, etc., or a combination of both matrix and additive. Preferred aqueous electrolytes are solutions of sodium halide salts. Preferred organic electrolytes are solutions of sodium halide salts in propylene carbonate.

I found that the above sealed primary sodium-halogen battery can be assembled by placing adjacent the upper open end of the ion-conducting casing a bead of high temperature, sodium and halogen resistant glass, such as Corning Glass No. 7056 or Kimble Glass No. N-51A by melting a glass washer around the upper exterior surface of the casing. This can be accomplished by heating in a furnace to about 1,000° C. A tube of similar glass to provide a glass envelope is positioned around the casing. Local radio frequency heating is employed to seal the glass envelope to the casing adjacent the open end of the casing. A first electronic conductor is positioned so that it is in contact with the interior surface of the casing and extends outwardly from the open end of the casing and through the glass tubing or envelope. A second electronic conductor is positioned within the glass envelope between the exterior surface of the casing and the glass envelope and extends outwardly through the other end of the glass envelope.

While the casing can be filled prior to sealing through the opening in the glass envelope with sodium, sodium as an amalgam or sodium in a non-aqueous organic electrolyte, it may also be desirable to seal a piece of a suitable metallic tube, such as tantalum, molybdenum or niobium to the edge of the opening in the glass envelope by melting the edge around the opening to the metallic tubing. The opposite tubes can be of different metals. For example, such glass might be sealed to molybdenum tubing after which a piece of niobium tubing could be secured to the molybdenum tubing by electron beam welding. The open end of the niobium tubing can be sealed by welding. The niobium tubing can be sealed to the glass in the same manner and then sealed by welding. The tantalum tubing might be sealed directly to the edges of the opening in the glass envelope. The open end of the tantalum tube can be sealed by pinching. If metallic tubing is not employed, the edge around the opening in the glass envelope can be sealed directly to the conductor thereby sealing the upper portion of the battery.

As discussed above, the opening in the lower portion of the glass envelope can be used prior to sealing for filling or can have a piece of metallic tubing sealed to the edges of the opening. A cathode of a halogen in conductive material is positioned within the glass envelope between the exterior surface of the casing and in contact with the casing. If no metallic tubing is employed, the glass envelope is sealed directly to the second conductor. If metallic tubing is employed for either or both of the openings in the glass envelope such tubing is suitably closed, for example, by welding. This results in a sealed primary sodium-halogen battery.

As it will be appreciated, the anode and cathode electrodes can be positioned in the opposite portions of the battery. A modified battery, as shown in FIG. 2, is assembled by sealing a first envelope portion of the above type glass adjacent the upper open end of the casing. A first conductor and anode material are then positioned in the casing. The opening in the glass envelope portion is sealed as above described. A second glass envelope portion is positioned around the casing and sealed to the first glass envelope portion. The remainder of the construction is the same as above described. This results also in a sealed primary sodium-halogen battery.

Examples of sealed primary sodium-halogen batteries which are made in accordance with my invention are set forth below:

EXAMPLE 1

A battery casing is assembled which consists of a casing of an ionic conducting material of sodium betaalumina with one open end. A glass washer of Corning Glass No. 7056 is positioned around the upper open end of the casing and sealed thereto by heating the casing and washer at 1000° C in a furnace. A high temperature sodium and halogen resistant glass envelope of Corning Glass No. 7056 is positioned around the casing and sealed to the casing adjacent its open end by local radio frequency heating of the glass washer and the glass envelope. A piece of tantalum tubing is sealed to each opposite end of the glass envelope by melting the edges around each opening against the associated tubing. A first electronic conductor of 2 mils thick tantalum wire is placed in contact with the interior surface of the casing and extends outwardly through the open end of the casing and through the tantalum tubing sealed to the glass envelope. A second electronic conductor is positioned within the lower portion of the glass envelope between the exterior surface of the casing and the glass envelope and extends outwardly through the tantalum tubing sealed to the glass envelope. This structure results in a battery casing.

EXAMPLE 2

A sealed primary sodium-halogen battery is assembled by filling the casing of the battery casing formed in Example 1 with sodium amalgam through the tantalum tubing associated with the upper portion of the glass envelope. After filling the sodium beta-alumina casing in this manner the tantalum tubing is sealed by welding. Carbon felt is positioned in the lower portion of the glass envelope to provide the conductive material. Bromine is then added through th tantalum tubing sealed to the lower portion of the glass envelope. The tantalum tubing is then sealed by welding. This structure results in a sealed primary sodium-bromine battery. At room temperature this battery has an open circuit voltage of 3.6 volts.

EXAMPLE 3

A battery casing was assembled which consisted of a casing of ionic conducting material of sodium betaalumina with one open end. A glass washer of Corning Glass No. 7056 was positioned around the upper open end of the casing after which the washer was sealed to the casing at 1,000° C in a furnace. A high temperature sodium and halogen resistant glass envelope of Corning Glass No. 7056 was provided in two portions. An upper portion was positioned around the casing and sealed to the casing adjacent its open end by indirect heating in a quartz shield of the washer and the glass envelope portion. A first electronic conductor of 2 mil thick tantalum wire was placed in contact with the interior surface of the casing and extended outwardly through the open end of the casing and the glass envelope portion. A piece of molybdenum tubing previously welded to a piece of tantalum tubing was sealed to the open end of the glass envelope portion by melting the edges around the opening against the associated molybdenum tubing. A first conductor was extended through the tubing. A second glass envelope portion was positioned around the exterior surface of the casing and sealed to the exterior surface of the first glass envelope portion. A piece of molybdenum tubing previously welded to a piece of tantalum tubing was sealed to the open end of the second glass envelope portion by melting the edges areound the opening against the associated molybdenum tubing. A second electronic conductor was positioned within the glass envelope portion between the exterior surface of the casing and the glass envelope portion and extended outwardly through the tubing of the glass envelope portion. This structure resulted in a battery casing.

EXAMPLE 4

A sealed primary sodium-halogen battery is assembled by filling the upper envelope portion of the battery casing formed in Example 3 through its associated tantalum tubing with sodium as an amalgam. The tantalum tubing is then sealed by welding. The lower glass envelope portion is filled through its associated tantalum tubing with carbon felt material and bromine. The tantalum tubing is then sealed by welding. The resulting structure is a sealed primary sodium-bromine battery. At room temperature this battery has an open circuit voltage of 3.6 volts.

While other modifications of the invention and variations thereof which may be employed within the scope of the invention have not been described, the invention is intended to include such as may be embraced within the following claims.

What I claim as new and desire to secure by letters Patent of the United States is:

1. A sealed primary sodium-halogen battery comprises a casing of a solid sodium ion-conductive material with one open end, a first electrode positioned in the casing, a high temperature sodium and halogen resistant closed glass envelope surrounding the casing and sealed to the casing adjacent its open end, a first electronic conductor in contact with the interior surface of the casing and extending outwardly through the open end of the casing and the glass envelope, a second electronic conductor positioned within the glass envelope between the exterior surface of the casing and the glass envelope and extending outwardly through the glass envelope, a second electrode positioned within the glass envelope between the exterior surface of the casing and the glass envelope and in contact with the casing, one of the electrodes selected from the class consisting of sodium, sodium as an amalgam, and sodium in a non-aqueous organic electrolyte, the other electrode comprising a halogen in conductive material, and the halogen selected from the class consisting of bromine, and a mixture of bromine and iodine with from 5 to 60 weight percent iodine.

2. In a sealed primary sodium-halogen battery as in claim 1, in which the high temperature glass envelope comprises an upper portion and a lower portion, the upper portion is sealed to the casing adjacent its open end, and the lower portion surrounds the casing and is sealed to the exterior surface of the first portion.

3. In a sealed primary sodium-halogen battery as in claim 1, in which each electronic conductor extends outwardly through the glass envelope and is surrounded adjacent the glass envelope by a metallic tube which is sealed to the glass envelope and sealed at its opposite end against the electronic conductor.

4. In a sealed primary sodium-halogen battery as in claim 1, in which the conductive material of the cathode is carbon felt.

5. In a sealed primary sodium-halogen battery as in claim 1, in which the conductive material of the cathode is foam metal.

6. In a sealed primary sodium-halogen battery as in claim 1, in which the conductive material of the cathode is a non-aqueous organic electrolyte.

7. In a sealed primary sodium-halogen battery as in claim 6, in which the non-aqueous organic electrolyte is a sodium salt dissolved in propylene carbonate.

8. In a sealed primary sodium-halogen battery as in claim 1, in which the conductive material of the cathode is an aqueous electrolyte.

9. In a sealed primary sodium-halogen battery as in claim 8, in which the aqueous electrolyte is a sodium salt dissolved in water.

* * * * *